(12) United States Patent
Xiang et al.

(10) Patent No.: US 9,578,495 B2
(45) Date of Patent: Feb. 21, 2017

(54) HANDLING IMPAIRED WIRELESS CONNECTION IN A COMMUNICATION SYSTEM

(71) Applicant: Qualcomm Incorporated, San Diego, CA (US)

(72) Inventors: Pei Xiang, San Diego, CA (US); Hesu Huang, San Diego, CA (US); Lukai Cai, San Diego, CA (US); Khaled Helmi El-Maleh, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 803 days.

(21) Appl. No.: 13/665,621

(22) Filed: Oct. 31, 2012

(65) Prior Publication Data

US 2013/0159552 A1 Jun. 20, 2013

Related U.S. Application Data

(60) Provisional application No. 61/577,613, filed on Dec. 19, 2011.

(51) Int. Cl.
*G06F 15/16* (2006.01)
*H04W 8/30* (2009.01)
(Continued)

(52) U.S. Cl.
CPC ............ *H04W 8/30* (2013.01); *H04L 69/40* (2013.01); *H04W 4/18* (2013.01); *H04W 4/028* (2013.01)

(58) Field of Classification Search
CPC .......... H04W 8/30; H04W 4/02; H04W 4/18; H04W 68/00; H04W 4/16; H04W 69/40
(Continued)

(56) References Cited

U.S. PATENT DOCUMENTS 6,032,056 A 2/2000 Reudink
8,023,964 B2 * 9/2011 Hadinata et al. .......... 455/456.1
(Continued)

FOREIGN PATENT DOCUMENTS

EP 2073486 A1 6/2009
JP 2004228851 A 8/2004
(Continued)

OTHER PUBLICATIONS

Curcio, I.D.D., et al., "Geo-predictive real-time media delivery in mobile environment", Proceedings of the 3RO Workshop on Mobile Video Delivery, MOVID '10, Jan. 1, 2010, pp. 3-8, XP055051709, New York, New York, USA, DOI: 10.1145/1878022.1878036 ISBN: 978-1-45-030165-7 p. 3-5.
(Continued)

*Primary Examiner* — Moustafa M Meky
(74) *Attorney, Agent, or Firm* — Knobbe Martens Olson & Bear LLP

(57) ABSTRACT

A wireless communication system and related techniques and apparatuses are disclosed that predict future disconnections or other connection impairments with end-user portable devices in advance so that service interruptions can be handled more gracefully. The system can predict the loss of service based on user-usage information associated with the portable device, such as the current GPS location of the device, its direction and velocity of travel, a user calendar, user habits and other information, such as the time of day, weather conditions, or wireless network coverage maps. An impairment handling method is selected that alters the content presented by the portable device. The impairment handling method is executed by the system upon detecting the impairment of the wireless connection so that the content is altered during occurrence of the impairment. The altera-
(Continued)

tion of the content is done to mitigate the user-perceived effect of the impairment.

52 Claims, 11 Drawing Sheets

(51) Int. Cl.
*H04W 4/18* (2009.01)
*H04L 29/14* (2006.01)
*H04W 4/02* (2009.01)

(58) Field of Classification Search
USPC ...... 709/200–203, 217–227, 246; 455/412.2, 455/421, 422.1, 439, 440
See application file for complete search history.

(56) References Cited

U.S. PATENT DOCUMENTS

| | | | |
|---|---|---|---|
| 8,098,590 B2 | 1/2012 | Catovic et al. | |
| 8,180,375 B2* | 5/2012 | Awad | 455/456.3 |
| 8,295,838 B2* | 10/2012 | Abdel-Kader et al. | 455/436 |
| 8,620,319 B1* | 12/2013 | Thandu et al. | 455/436 |
| 8,700,061 B2* | 4/2014 | Abdel-Kader et al. | 455/456.1 |
| 8,948,738 B2* | 2/2015 | Bauchot et al. | 455/421 |
| 2004/0203698 A1 | 10/2004 | Comp | |
| 2006/0109825 A1* | 5/2006 | Abdel-Kader et al. | 370/338 |
| 2007/0006317 A1 | 1/2007 | Asami et al. | |
| 2009/0247137 A1* | 10/2009 | Awad | 455/418 |
| 2009/0247147 A1* | 10/2009 | Hadinata et al. | 455/421 |
| 2010/0048133 A1 | 2/2010 | Wang et al. | |
| 2010/0054185 A1 | 3/2010 | Kaneko et al. | |
| 2010/0151840 A1* | 6/2010 | Bauchot et al. | 455/414.1 |
| 2011/0208517 A1 | 8/2011 | Zopf | |
| 2012/0220290 A1* | 8/2012 | Awad | 455/423 |
| 2013/0010778 A1* | 1/2013 | Abdel-Kader et al. | 370/338 |
| 2013/0229270 A1* | 9/2013 | Srinivasan et al. | 340/328 |

FOREIGN PATENT DOCUMENTS

| | | |
|---|---|---|
| JP | 2007013877 A | 1/2007 |
| JP | 2007184951 A | 7/2007 |
| JP | 2010062783 A | 3/2010 |
| WO | WO-2009152097 A1 | 12/2009 |

OTHER PUBLICATIONS

Hsieh H.Y., et al., "Enhancing campus VoIP service for ubiquitous communication on dual-mode mobile handsets", Computers and Communications, 2008. ISCC 2008. IEEE Symposium on, IEEE, Piscataway, NJ, USA, Jul. 6, 2008, pp. 1159-1165, XP031321464, ISBN: 978-1-4244-2702-4, p. 1160-1164.
International Search Report and Written Opinion—PCT/US2012/063047—ISA/EPO—Feb. 7, 2013.
Riiser, H., et al., "Bitrate and video quality planning for mobile streaming scenarios using a GPS-based bandwidth lookup service", Multimedia and Expo (ICME), 2011 IEEE International Conference on, IEEE Jul. 11, 2011, pp. 1-6, XP031964723, DOI: 10.1109/ICME.2011.6012045 ISBN: 978-1-61284-348-3.

\* cited by examiner

HANDLING IMPAIRED WIRELESS CONNECTION IN A COMMUNICATION SYSTEM

CLAIM OF PRIORITY UNDER 35 U.S.C. §119

The present Application for Patent claims priority to U.S. Provisional Application No. 61/577,613, filed Dec. 19, 2011, assigned to the assignee hereof and hereby expressly incorporated by reference herein.

BACKGROUND

Field

The present disclosure generally relates to wireless communication systems, and more specifically, to improved handling of dropped or otherwise impaired wireless connections.

Background

In today's digital world, users can enjoy lots of activities when "connected," i.e., wirelessly communicating with a cloud service, another person or a broadcasting network. When such connections are dropped or discontinued at an unwanted time, the user's enjoyment may suffer.

SUMMARY

This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Disclosed herein are techniques that analyze user-usage data, environmental data, network data, and/or location data to anticipate wireless service disconnects and select and execute certain error handling methods when such disconnects occur. Each error handling method alters content being presented by a user device to mitigate the effects of the connection outage.

In accordance with an aspect of the techniques, a system includes a portable device configured to present content to a user. The content is delivered to the portable device over a wireless connection. The system also includes one or more processors configured to predict, based on user usage of the portable device, a future temporary impairment of the wireless connection. As a result of the prediction, the processor then alters the content being presented by the portable device during the predicted time period of the impairment.

According to a further aspect, a system includes means for presenting content at a portable device operating in a wireless communication system. The content is delivered to the portable device over a wireless connection. The system also includes means for predicting, based on user usage of the portable device, a future temporary impairment of the wireless connection, and means for altering the content being presented by the portable device during the predicted impairment.

According to a further aspect, a computer-readable medium embodying a set of instructions executable by one or more processors stores code for presenting content at a portable device operating in a wireless communication system. The content is delivered to the portable device over a wireless connection. The medium also stores code for predicting, based on user usage of the portable device, a future temporary impairment of the wireless connection, and code for altering the content being presented by the portable device during the predicted impairment.

According to a further aspect, a method of handling a temporarily impaired wireless connection to a portable device operating in a wireless communication system includes presenting content at the portable device, the content being delivered to the portable device over the wireless connection; predicting, by the wireless communication system and based on user usage of the portable device, a future temporary impairment of the wireless connection; and altering the content being presented by the portable device during the impairment, as a result of predicting the impairment.

Other aspects, features, and advantages will be or will become apparent to one with skill in the art upon examination of the following figures and detailed description. It is intended that all such additional features, aspects, and advantages be included within this description and be protected by the accompanying claims.

BRIEF DESCRIPTION OF THE DRAWINGS

It is to be understood that the drawings are solely for purpose of illustration. Furthermore, the components in the figures are not necessarily to scale, emphasis instead being placed upon illustrating the principles of the techniques and devices described herein. In the figures, like reference numerals designate corresponding parts throughout the different views.

DETAILED DESCRIPTION

Figure 1:
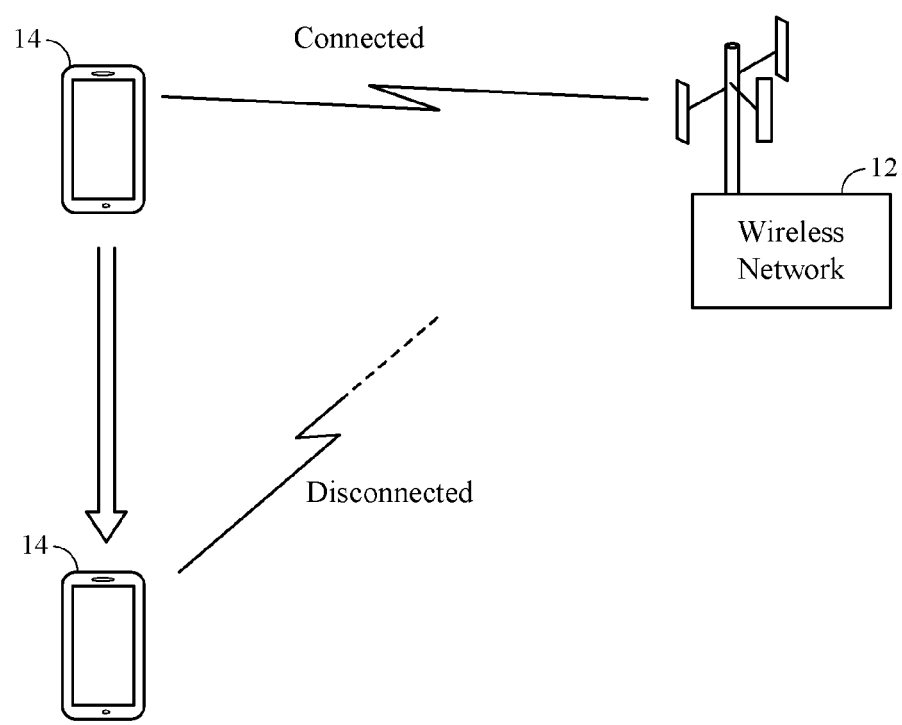
FIG. 1 illustrates an exemplary wireless system in which a portable device loses its connection to a wireless network.

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

The word "exemplary" is used throughout this disclosure to mean "serving as an example, instance, or illustration." Anything described herein as "exemplary" is not necessarily to be construed as preferred or advantageous over other approaches or features.

Generally, this disclosure has to do with a wireless communication system that predicts disconnections with end-user portable devices in advance so that the service interruptions can be handled more gracefully. The system predicts the loss of service based on information such as the current GPS location of the user device, its direction and velocity of travel, time of day, weather conditions, wireless network coverage maps, user calendar of events, user habits, etc. The predicted loss of service may occur just seconds before it actually happens.

The portable devices can include mobile devices, such as personal digital assistants (PDAs), smart phones, personal computers, entertainment systems, cellular phones, video game devices and the like.

Prior to the loss actually happening, the system intelligently decides how to handle the connection error. It may handle it in one of several ways, depending on the length of time that the loss is predicted to exist. For example, the system may handle the error by: 1) muting the corrupted communication signal; 2) time warping the media signal (voice and/or audio) to stretch it to cover the period of loss, if the loss period is short enough; 3) inserting alternative entertainment or advertising information; and/or 4) inserting a warning alert before the loss happens to warn the user of the impending loss of service and predicted return of service.

For error handling method 3), the inserted filler content can be downloaded and pre-stored on the portable user device from, for example, a cloud storage system as a result of the system anticipating the user's loss of service. The download may occur just prior to the loss actually occurring or the content may be pre-loaded onto the portable device prior to user operation.

Examples of the improved error prediction and handling processes and systems are generally shown in the drawings included herewith. These methods and systems directly address improving the user experience and intelligently utilizing system resources to achieve this goal. Proactively predicting possible connection errors that can cause a dropped wireless connection and then appropriately handling concealment/correction of the lost connection is a significant improvement.

FIG. 1 illustrates an exemplary wireless system 10 in which a portable device 14 loses its connection to a wireless network 12. As shown, the portable device 14 maintains a radio frequency (RF) connection to the wireless network 12 while in a first location. When the portable device 14 moves to a second location, the wireless connection is lost and the device 14 is disconnected from the network 12. The disconnection may occur due to a variety of reasons, including moving out of range of the wireless network's coverage area, or physical obstructions that block or weaken the RF signals of the connection, such as geographic features, e.g., hills or mountains, buildings and/or other structures. The connection impairment may also happen due to other reasons not caused by movement of the device 14, such as weather conditions or network operating conditions causing a service outage or dropped connection.

As described in greater detail below, the system 10 is configured to predict the disconnection with the portable device 14 in advance so that connection interruptions can be handled more gracefully.

Figure 2:
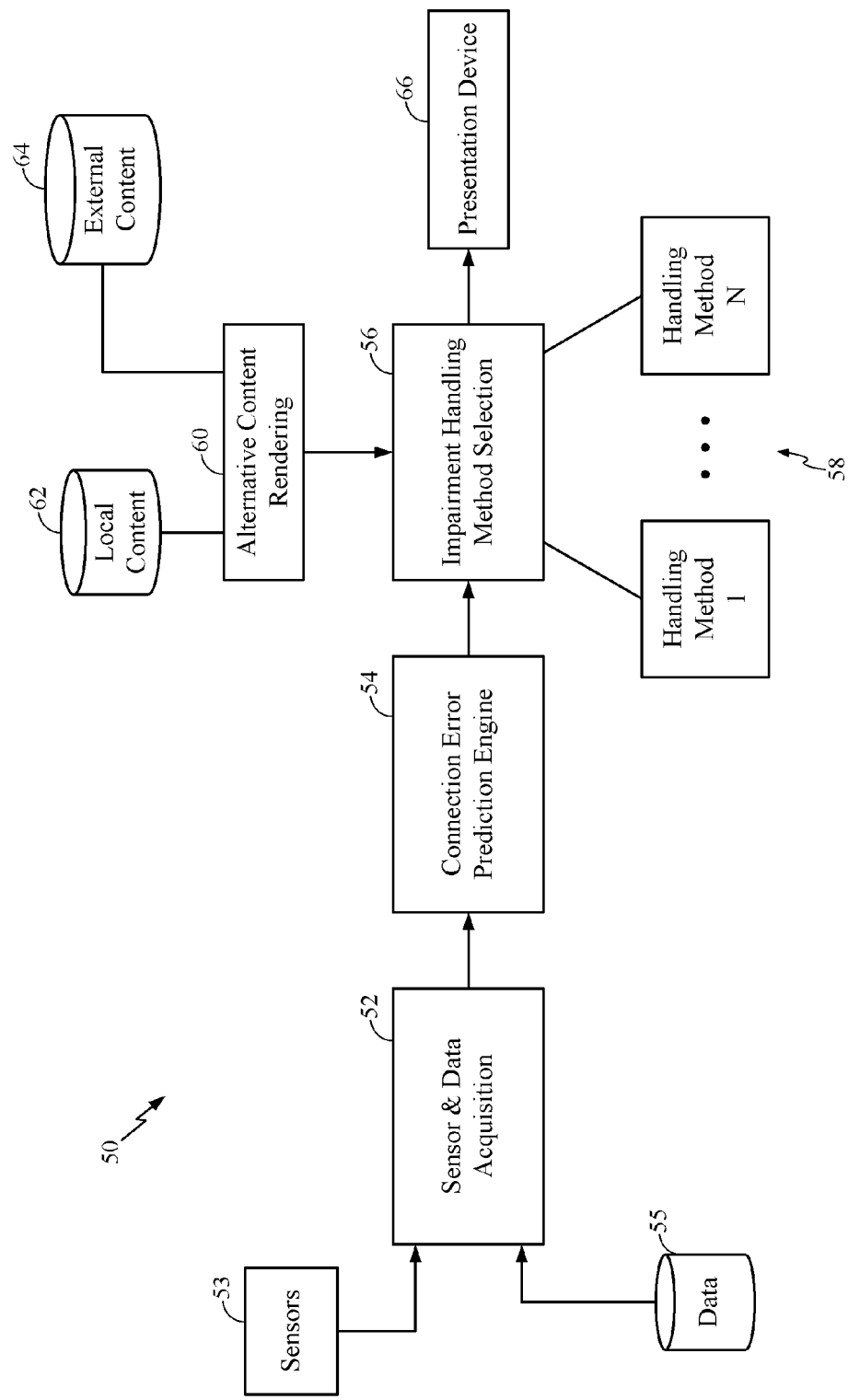
FIG. 2 is a block diagram illustrating an exemplary system for predicting and handling impaired wireless connection.

FIG. 2 is a block diagram illustrating an exemplary system 50 for predicting and handling impaired wireless connections. The system 50 may be included in the wireless communication system 10 of FIG. 1. The system 50 includes a sensor and data acquisition block 52 receiving sensor data from one or more sensors 53 and various types of data from one or more data sources 55. The system 50 also includes a connection error prediction engine (CEPE) 54, an impairment handling method selection block 56, impairment handling methods 58, alternative content rendering engine 60, local content storage 62, external content storage 64, and one or more presentations devices 66.

The data sources 55 may provide data concerning the environment in which a portable device is operating, device location, direction of travel, speed of travel, network coverage map information, weather and the like. The sources 55 may include storage devices and their interfaces for storing such data either locally on a portable device and/or remotely on networked servers. The sensors 53 may provide data concerning GPS coordinates of a portable device, time of day, wireless connection strength and the like. For example, the sensors 53 may include a GPS module included in a portable device for communicating with GPS satellites, and/or an air interface for wireless communications with a cellular network, wherein the air interface is configured to determine the strength of the wireless channels with the network. These data are periodically gathered by the sensor and data acquisition block 52, and are then put to use through data fusion performed by the CEPE 54. Velocity information about the portable device may be provided by sensors 53, or may alternatively be calculated by the acquisition block 52 using GPS coordinate data gathered by the block 52 over a predefined period of time.

The CEPE 54 predicts future impairments to the portable device's wireless connection based on data provided to the CEPE by the sensor and data acquisition block 52. The CEPE 54 may calculate the severity of the impairment, for example, a complete loss of the connection verses moderately degraded signal quality, and the predicted start time and duration of the impairment.

The prediction of the temporary loss of wireless service may be made based on GPS location, speed and direction of travel of the portable device. Additionally/alternatively, the prediction can be made based on a carrier network coverage map, time of day, local weather conditions, local traffic conditions, detected signal strength and/or the like.

Additionally/alternatively, the prediction can be made based on location tags uploaded into a cloud (e.g., facebook or other social network) from a user community. The tags identify locations that have poor signal reception. Each tag may include GPS coordinates, and may be weighted according to the number of community users reporting the location as having poor signal reception. The tags may be periodically pushed onto the portable device of a community member.

Any suitable combination of the foregoing data and information may be used to predict connection impairments by the CEPE 54.

The predicted timing, severity and duration of the anticipated impairment are passed to the impairment handing method selection block 56. Based on the information from the CEPE 54, the selection block 56 selects one or more handling methods 58 that are to be executed when the connection impairment is predicted to occur. The impairment (error) handling methods may include 1) time warping the content of the user's current communication session; 2) inserting filler/alternative content; 3) providing a user warning of impeding loss of service; 4) muting content signal during loss period; or any suitable combination of the foregoing handling methods.

The time warping content may be selectively used, for example, only when the loss period is less than a predefined duration. Content is time-warped by stretching or shrinking in the time domain the audio and/or video signal corresponding to the content. In particular, time-warping is used to stretch or shrink the time axis of the audio and/or visual signal associated with the content to align it with a period of time during which an impairment is to be concealed. Time warping is a general technique that can be applied to audio and/or video content and embedded software for performing time warping is commercially available.

If the selected impairment handling method includes presenting alternative or filler content during the connection disruption period, such content can be render for presentation on the user portable device by the alternative content rendering block 60. The content rendering block 60 can retrieve content from a local content storage source 62, which may be located within the portable device, or from an external content storage source 64. The external content storage source 64 can be a server that is included as part of a cloud service system.

The alternative/filler content can alternatively be pushed onto a portable user device from the external content source 64, upon predicting the imminent loss of wireless service, but prior to actually losing service. Additionally/alternatively, the filler content can be pre-loaded onto a portable device.

The selected impairment handling method is then executed by the system 50 at the predicted time of the impairment. The output of the selected handling method is provided to one or more presentation devices 66 that are included in the user's portable device. The selected handling method alters content currently being presented on the presentation device(s) 66 to mask or conceal the effects of the connection disruption. Content includes audio and/or visual information that can be digitally represented. In certain configurations, the selected impairment handling method alters the content by manipulating the digital signals representing such content. The presentations devices 66 may include a visual display and/or audio output components such as speakers or headphones.

Figure 3:
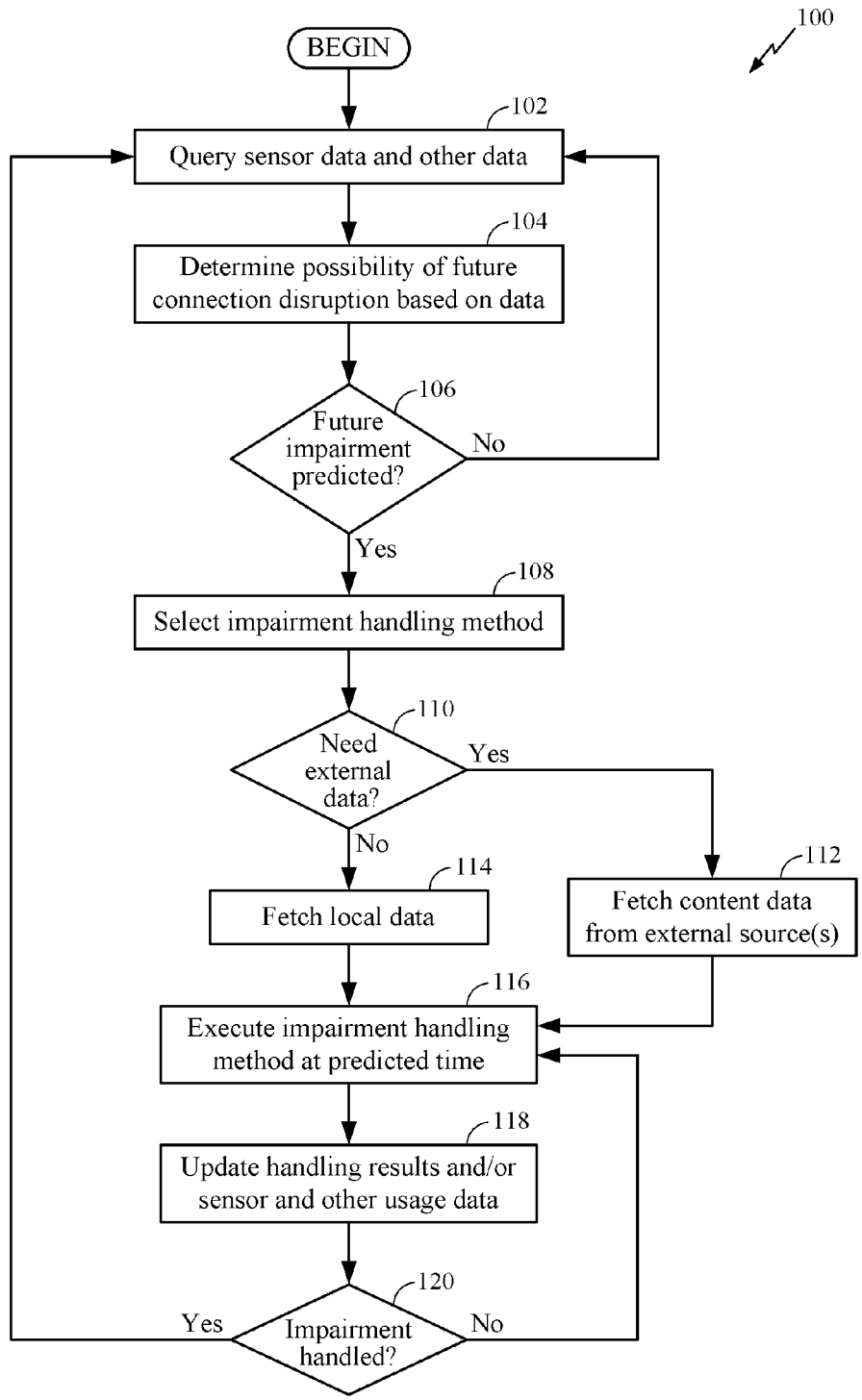
FIG. 3 shows a flowchart of an exemplary method of operating the system of FIG. 2.

FIG. 3 shows a flowchart 100 of an exemplary method of operating the system 50 of FIG. 2. In block 102, sensor(s) and a data source(s) are queried to retrieve data relevant to predicting a connection impairment for a portable device.

In block 104, the possibility of a future connection disruption (impairment) is determined based on the retrieved data. The connection disruption can be predicted based on, for example, the calculated direction and speed of travel of the portable device and a comparison thereof to a wireless network coverage map.

In decision block 106, a check is made as to whether a future connection impairment is imminent. For example, based on the comparison of the portable device velocity to a network coverage map, the system can predict the occurrence time of the impairment and estimate its duration. The predicted occurrence time can be compared to a threshold, and if the disruption is to happen within the time specified by the threshold, the impairment is determined to be imminent. If the impairment is not imminent, the method returns to box 102. However, if a connection impairment is predicted, the method proceeds to box 108.

In box 108, an impairment handling method is selected. The handling method may be selected according to the predicted start time and/or duration of the connection disruption. The handling method selection may also depend upon the availability of alternative content and/or user inputs and setting. As discussed above in connection with FIG. 2, the impairment handling methods may include 1) time warping the content of the user's current communication session; 2) inserting filler/alternative content; 3) providing a user warning of impeding loss of service; 4) muting content signal during loss period; or any suitable combination of the foregoing handling methods.

In decision box 110, a check is made to determine whether external content data is needed by the selected handling method. The content data may be alternative filler content, such as audio and/or video content files. If external content is not required, the method proceeds to box 114 are retrieves any local content that may be required by the selecting handling method. However, if content from external sources is needed, the method proceeds to box 112 and the content is fetched from one or more external sources.

In box 116, the selected handling method is executed at the predicted time of the impairment to reduce the perceived effect of the connection disruption.

In box 118, the results of the handling method and readings from sensors and prediction data sources are updated.

In decision box 120, a check is made to determine whether the impairment has been handled. This may be done by checking the elapsed time from starting execution of the handling method and comparing it to the predicted duration of the connection impairment. If it is determined that the impairment has be appropriately handled, the method returns to box 102. However, if the impairment handling method has not completed, the method returns to box 116 to continue execution of the handling method.

Figure 4:
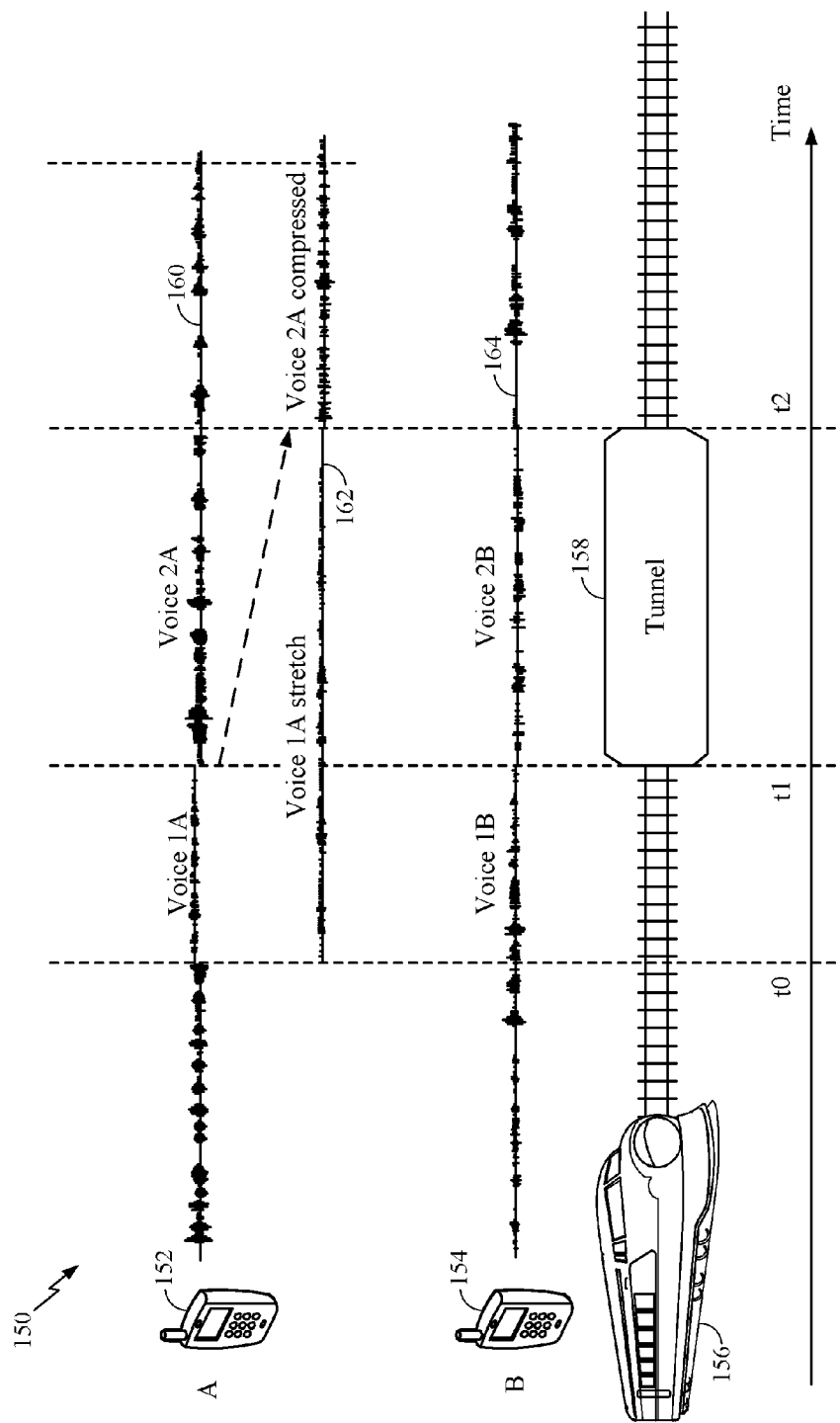
FIG. 4 shows a timeline graph illustrating the process of time warping a voice signal in an example operational scenario.

FIG. 4 shows a timeline graph 150 illustrating the process of time warping a voice signal in an example operational scenario. The graph 150 depicts voice signals output at portable device A 152 and portable device B 154. The device A 152 travels by train 156 through a tunnel 158, where it loses its wireless connection. Voice signal 160 depicts the voice signal output by device A 152, unaltered by an impairment handling method. A second voice signal 162 depicts the voice signal output by device A 152 as result of time warping the voice signal 160 to stretch so that it covers the impairment period, t1-t2, as the train 156 passes through the tunnel. A third voice signal 164 depicts the voice signal output by the second device B 154.

Figure 5:
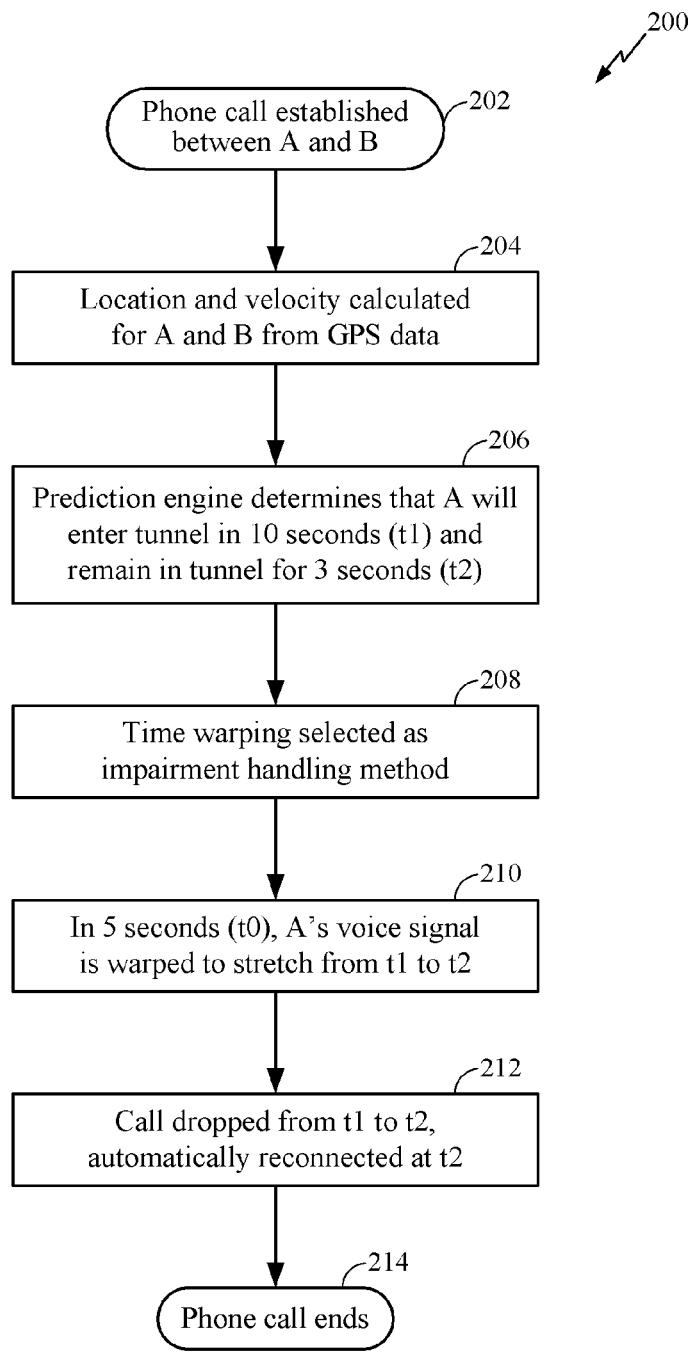
FIG. 5 shows a flowchart of a first exemplary method of handling the dropped wireless connection described in connection with FIG. 4.

FIG. 5 shows a flowchart 200 of a first exemplary method of handling the dropped wireless connection described in connection with FIG. 4. In box 202, a call is established between portable device A 152 and portable device B 154 through a wireless network. In box 204, the location and velocity of both portable device A and B 152, 154 may be calculated from GPS coordinate data for both devices.

In box 206, the CEPE determines that device A 152 will enter a tunnel at a future time, e.g., in ten seconds at time t1. The CEPE further determines that device A 152 will remain in the tunnel for a certain duration, e.g., three seconds until time t2. These determinations can be made by comparing the location and velocity calculated for device A 152 to a stored digitized geographic map of the terrain and features surrounding device A 152 at its current location. The CEPE also predicts that the wireless connection between devices A and B will be lost during the transit of the tunnel, between times t1 and t2.

In box 208, an impairment handling method is selected to deal with the lost wireless connection between devices A and B. In this case, time warping is selected for mitigating the effect of the lost connection during passage through the tunnel.

In box 210, at a time prior to the predicted connection loss, time t0, e.g., five seconds before entering the tunnel, device A 152 warps its voice signal to stretch from time t1 to t2. This is shown by stretch voice signal 162 of FIG. 4.

In box 212, the call between devices A and B 152, 154 is dropped from time t1 to t2 as the train passes through the tunnels. During this period, the user at device A 152 hears the slowed-down, stretched voice signal 162. At time t2, the wireless system automatically reconnects the call between device A and B. In box 214, the call is terminated.

Figure 6:
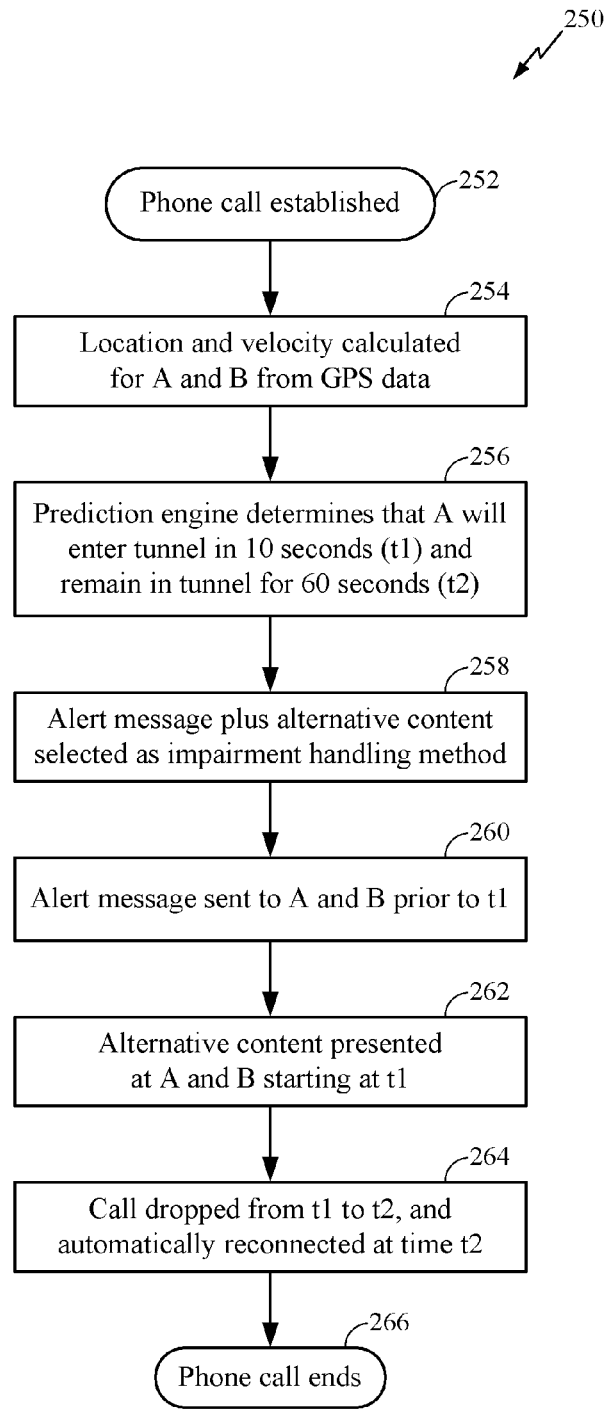
FIG. 6 shows a flowchart of a second exemplary method of handling the dropped wireless connection described in connection with FIG. 4.

FIG. 6 shows a flowchart 250 of a second exemplary method of handling the dropped wireless connection described in connection with FIG. 4. In box 252, a call is established between portable device A 152 and portable device B 154 through a wireless network. In box 254, the location and velocity of both portable device A and B 152, 154 may be calculated from GPS coordinate data for both devices.

In box 256, the CEPE determines that device A 152 will enter a tunnel at a future time, e.g., in ten seconds at time t1, and remain in the tunnel for 60 seconds, until time t2. These determinations can be made by comparing the location and velocity calculated for device A 152 to a stored digitized geographic map of the terrain and features surrounding device A 152 at its current location. The CEPE also predicts that the wireless connection between devices A and B will be lost during the transit of the tunnel, between times t1 and t2.

In box 258, an impairment handling method is selected to deal with the lost wireless connection between devices A and B. In this case, since the duration of the connection impairment is too long to effectively time warp the voice signal, an alert message plus alternative filler content is selected for mitigating the effect of the lost connection during passage through the tunnel.

In box 260, at a time prior to the predicted connection loss, e.g., five seconds before entering the tunnel, devices A and B 152, 154 present the alert message to the users warning them that their call is about to be dropped for 60 seconds and then automatically reconnected.

In box 262, the alternative content is presented at both devices A and B, starting at time t1.

In box 264, the call between devices A and B 152, 154 is dropped from time t1 to t2 as the train passes through the tunnels. During this period, the users at devices A and 152, 154 hear the filler content. At time t2, the wireless system automatically reconnects the call between device A and B and the filler content is discontinued. In box 266, the call is terminated.

Figure 7:
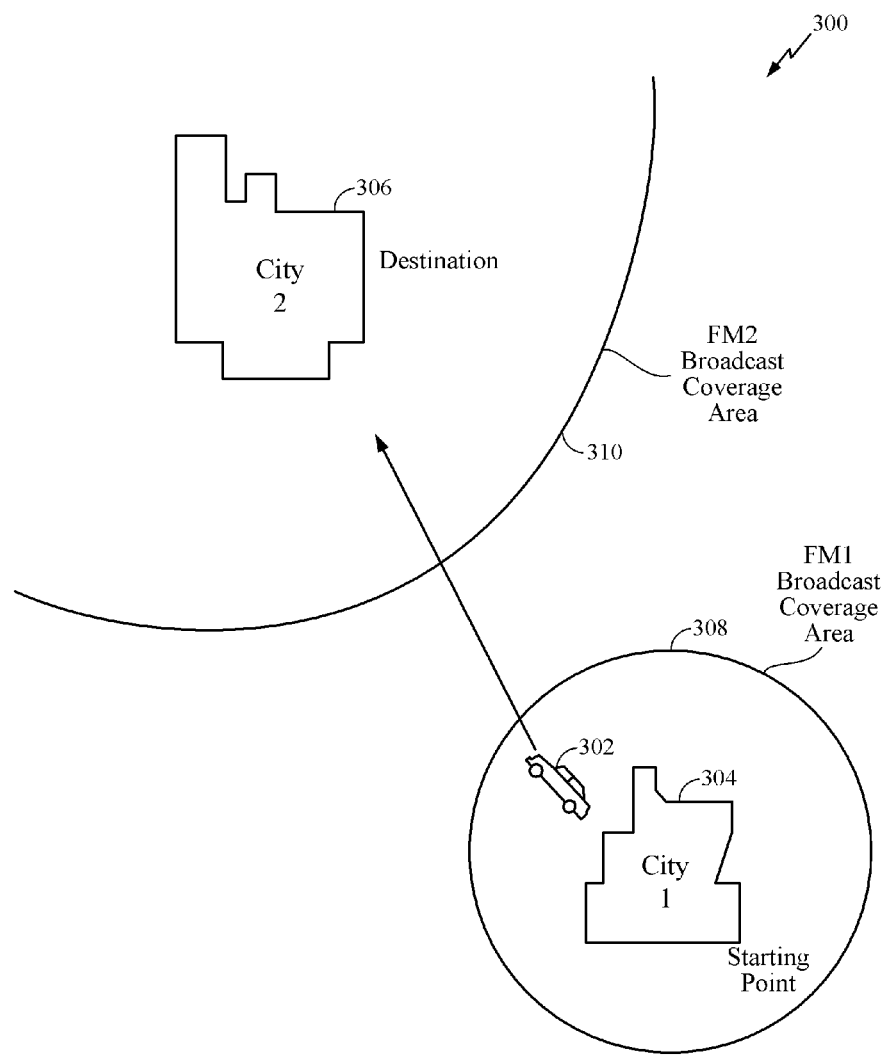
FIG. 7 is a diagram illustrating the loss of a wireless broadcast during a car trip between two cities.

FIG. 7 is a diagram illustrating the loss of a wireless broadcast during a car trip between two cities. The diagram depicts an exemplary geographic area 300 having a first city (City 1) 304, a second city (City 2) 306, and a vehicle traveling from the first city 304 to the second city 306. A first radio station located in City 1 304, e.g., a first FM station, FM1 broadcasts over a first broadcast coverage area 308, and a second radio station e.g., a second FM station, FM2, located in City 2 306 broadcasts over a second broadcast coverage area 310.

A user in the car 302 may begin his/her journey listening to the FM1 station. As the car 302 travels away from City 1, the signal from the FM1 station fades, while the signal from the FM2 station grows stronger.

The systems and methods disclosed herein may be used in this scenario to predict when a radio or TV broadcast station will fade out on a wireless device in the car 302, based on the user's location and direction of travel. When the broadcast loss occurs (e.g., due to a weak signal caused by user traveling away from the broadcast source FM1), the wireless device can 1) substitute a local broadcasting station, e.g. FM2, that is broadcasting similar content; or 2) substitute pre-recorded content from the original broadcasting station that has been stored on the device in lieu of the weakened, distorted radio or TV broadcast signal.

Figure 8:
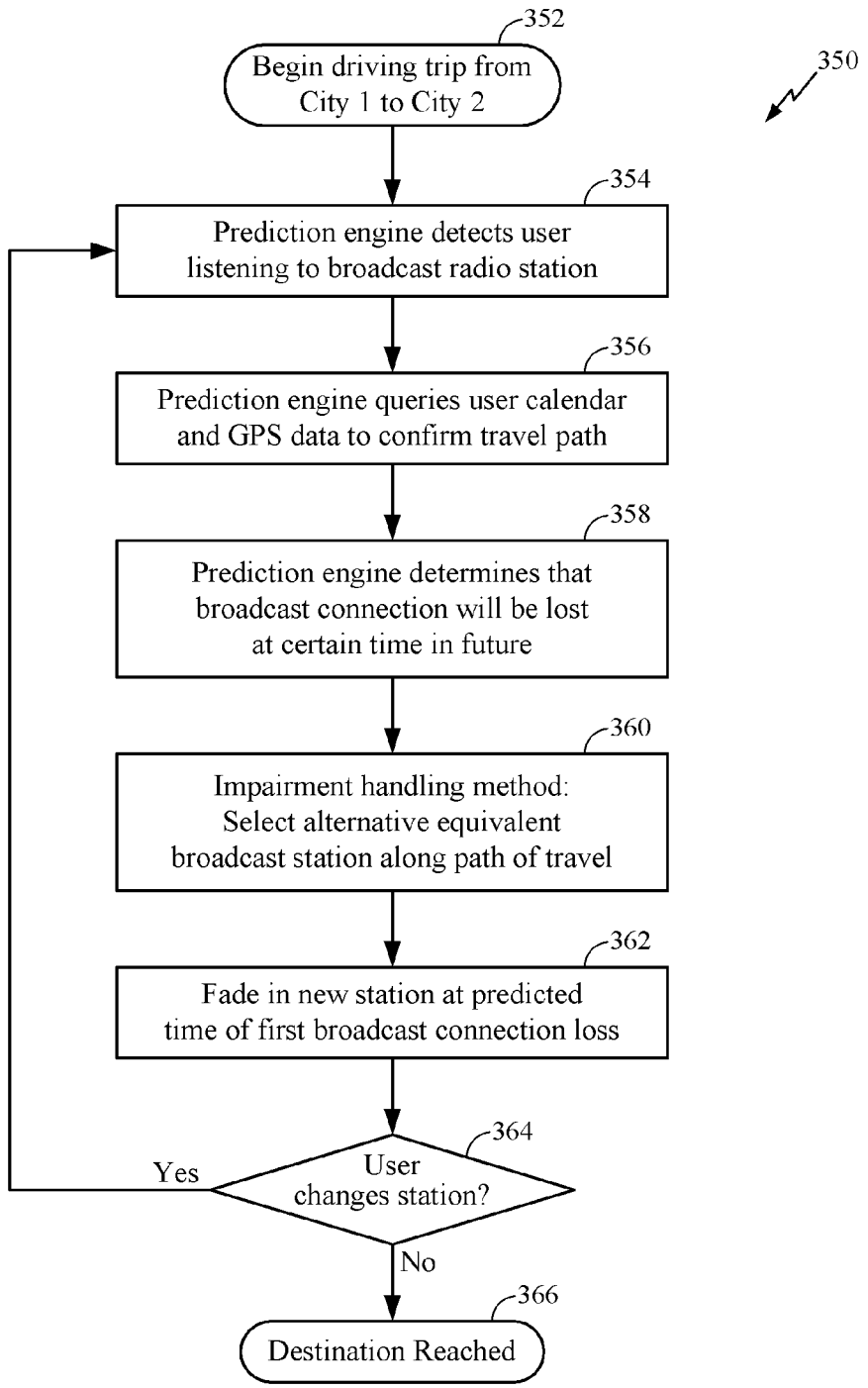
FIG. 8 shows a flowchart of a first exemplary method of handling the loss of the wireless broadcast of FIG. 7.

FIG. 8 shows a flowchart 350 of a first exemplary method of handling the loss of the wireless broadcast FM1 of FIG. 7. This method involves selecting an alternative broadcast station, such as FM2, as given in the example scenario of FIG. 7.

In box 352, the driver begins a driving trip in the car 304 going from City 1 to City 2. In box 354, the CEPE determines that the user is listening to a particular local radio station, FM1, by monitoring the operational state of the user's radio. The radio can be configured to make available to the CEPE a flag indicating its on/off state and a digital value indicating the radio frequency to which the radio is presently tuned. Any suitable digital data networking communication or bus scheme can be used to transfer this information from the user's radio to the CEPE.

In box 356, the CEPE queries a stored user calendar and GPS data to confirm the travel path from City 1 to City 2. The user calendar may include an entry indicating that the user is traveling to City 2 at a particular time and date. The location and velocity of the car's travel can be determined from the GPS data.

In box 358, the CEPE predicts that at the user's rate of travel, the broadcast connection with FM1 will be significantly degraded at a certain time in the future. This prediction can be based on the calculated user velocity and a stored map of the broadcast coverage area of FM1. Alternatively, the strength of FM1's broadcast signal can be periodically measured to predict when the broadcast will become unacceptably impaired from the user's perspective.

In box 360, an impairment handling method is selected to deal with the degraded broadcast connection between FM1 and the portable device in the car 304. In this case, an equivalent alternative broadcast station, FM2, along the travel path is selected to substitute for FM1 at the predicted time of the broadcast impairment. The alternative station can be selected from a database storing information about broadcast stations, such as their programming type, location, broadcast power, broadcast frequency, coverage map and the like. For example, the alternative station can be selected by matching the programming type indicated in the database records to that of the currently heard station and then comparing the user's GPS coordinate location with the coverage map records in the database to select a new local station with similar programming.

In box 362, the new broadcast station, FM2, is faded in on the portable device at the predicted time the first broadcast signal is lost.

In decision box 364, a check is made to determine whether the user has selected a different broadcast station. If not, the portable device continues to present the substituted broadcast until the device is turned off (e.g., the destination is reached, box 366). However, if the user should select a new station, the method returns to box 354.

Figure 9:
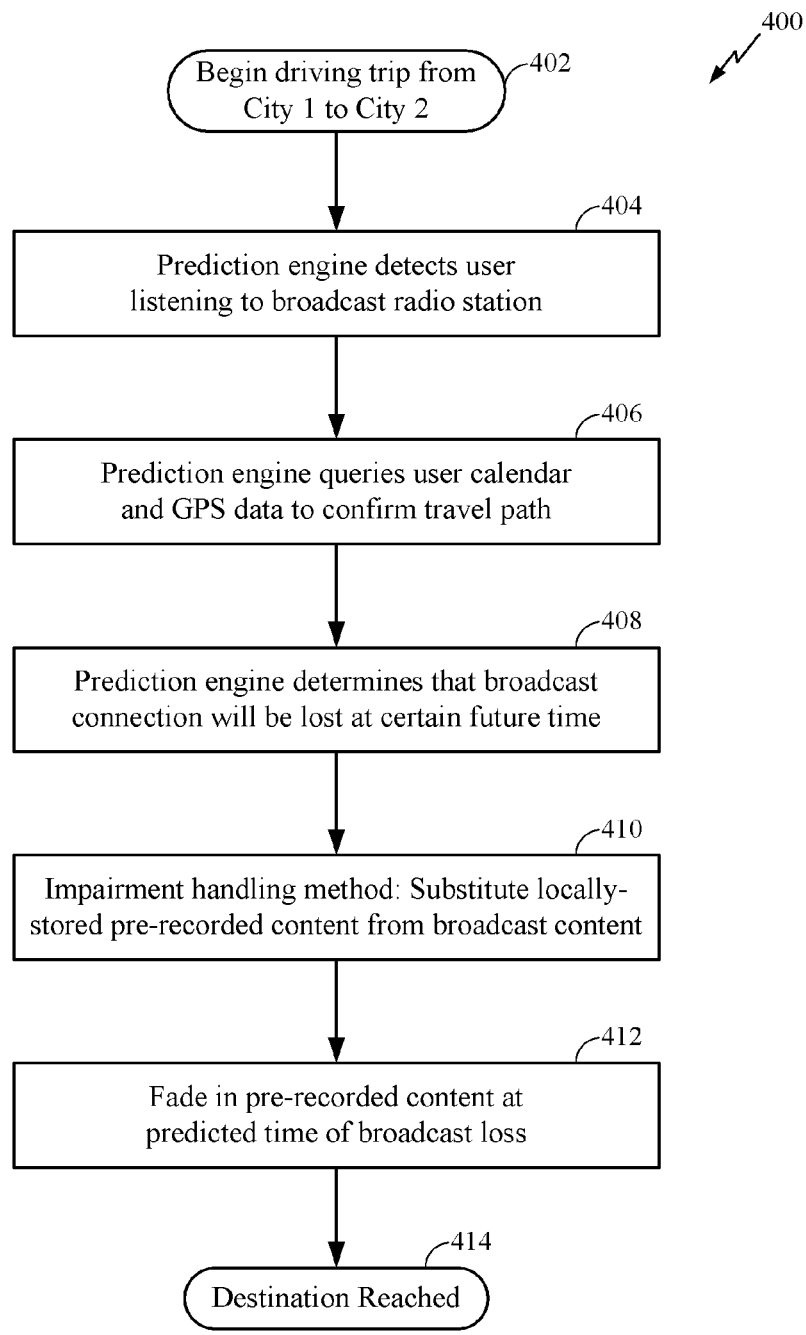
FIG. 9 shows a flowchart of a second exemplary method of handling the loss of the wireless broadcast of FIG. 7.

FIG. 9 shows a flowchart 400 of a second exemplary method of handling the loss of the wireless broadcast FM1 of FIG. 7. This method involves terminating reception of broadcasts from FM1 and substituting locally-stored, pre-recorded content for the FM1 broadcast.

In box 402, the driver begins a driving trip in the car 304 going from City 1 to City 2. In box 404, the CEPE determines that the user is listening to a particular local radio station, FM1. In box 406, the CEPE queries a stored user calendar and GPS data to confirm the travel path from City 1 to City 2. The user calendar may include an entry indicating that the user is traveling to City 2 at a particular time and date. The location and velocity of the car's travel can be determined from the GPS data.

In box 408, the CEPE predicts that, at the user's rate of travel, the broadcast connection with FM1 will be significantly degraded at a certain time in the future. This prediction can be based on the calculated user velocity and a stored map of the broadcast coverage area of FM1. Alternatively, the strength of FM1's broadcast signal can be periodically measured to predict when the broadcast will become unacceptably impaired from the user's perceptive.

In box 410, an impairment handling method is selected to deal with the degraded broadcast connection between FM1 and the portable device in the car 304. In this case, locally-stored, pre-recorded content is selected to substitute for FM1 at the predicted time of the broadcast impairment. The pre-recorded content that is equivalent in type to the programming of FM1 can be selected based stored information about broadcast stations including FM1, such as the station programming type, location, broadcast power, coverage map and the like.

In box 412, the pre-recorded content is faded in on the portable device at the predicted time the broadcast signal from FM1 is lost.

Figure 10:
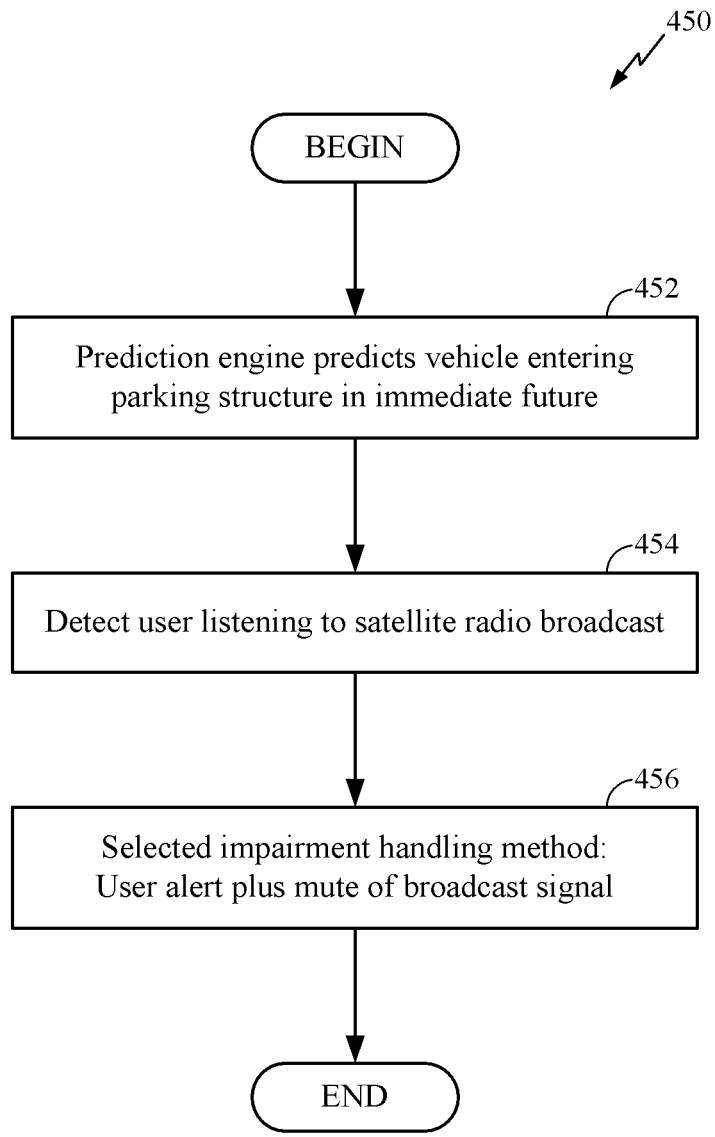
FIG. 10 is a flowchart of an exemplary method of handling the loss of a satellite broadcast.

FIG. 10 is a flowchart 450 of an exemplary method of handling the loss of a wireless connection, such as satellite broadcast, due to an obstruction. In box 452, the CEPE predicts that a portable device, such as a radio in a vehicle, is going to lose wireless coverage due to a particular event, such as entering a parking structure or building. In box 454, the system determines that the user is currently receiving content by way of a wireless connection, such as a satellite broadcast. In box 456, an impairment handling method is selected to deal with the lost connection. In this case, the impairment handling method presents an alert prior to the event, warning the user disconnection, and then mutes the broadcasted signal at the portable device.

Figure 11:
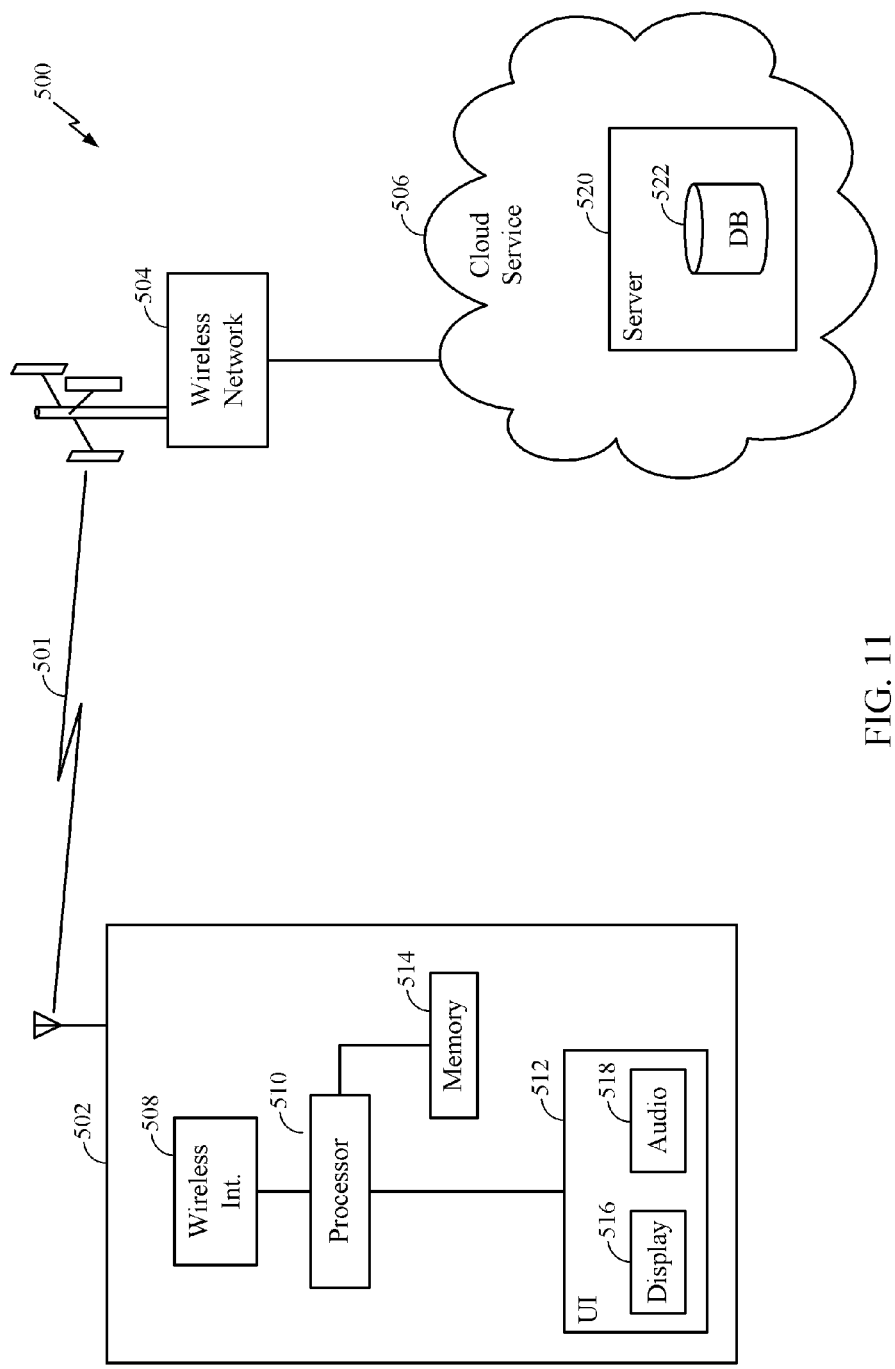
FIG. 11 is a block diagram illustrating certain components of an exemplary wireless communication system configured to predict and handle temporary impairments of wireless connections with a portable device.

FIG. 11 is a block diagram illustrating certain components of an exemplary wireless communication system 500 configured to predict and handle temporary impairments of a wireless connection 501 with a portable device 502. The system 500 can be configured to implement any or all of the systems and methods described in connection with FIGS. 1-10.

The wireless communication system 500 includes the portable device 502 in communication with a wireless network 504. The wireless network 504 communicates with a cloud service 506 that includes a server 520. The server 520 can include a database (DB) storing external content and/or other data that can be downloaded to the portable device 502 by way of the wireless network 504.

The portable device 502 includes a wireless interface 508, a processor 510, a user interface (UI) 512 and a memory 514. The UI 512 includes a visual display 516 and an audio user interface 518 for, among other things, outputting audio to a user. The processor 510 can use data and execute programming code stored in the memory 514 to implement the functionality of the system blocks 52-66 of FIG. 2 and the method steps disclosed herein.

The functionality of the systems, apparatuses, devices and their respective components, as well as the method steps and modules described herein may be implemented in hardware, software/firmware executed by hardware, or any suitable combination thereof. The software/firmware may be a program having sets of instructions (e.g., programming code segments) executable by one or more digital circuits, such as microprocessors, DSPs, embedded controllers, or intellectual property (IP) cores. If implemented in software/firmware, the functions may be stored as instructions or code on one or more computer-readable media. The computer-readable media may include computer storage media. A storage medium may be any available medium that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable medium.

Certain systems, techniques and methods have been disclosed. These systems, techniques and methods are examples, and the possible integrations are not limited to what is described herein. Moreover, various modifications to these examples are possible, and the principles presented herein may be applied to other systems as well. In addition, the various components and/or method steps/blocks may be implemented in arrangements other than those specifically disclosed without departing from the scope of the claims.

Accordingly, other embodiments and modifications will occur readily to those of ordinary skill in the art in view of these teachings. Therefore, the following claims are intended to cover all such embodiments and modifications when viewed in conjunction with the above specification and accompanying drawings.

What is claimed is:

1. A system, comprising:
   a portable device configured to present content to a user, the content being delivered to the portable device over a wireless connection; and
   at least one processor configured to:
   predict, based on user usage of the portable device, a future temporary impairment of the wireless connection;
   determine a severity of the temporary impairment, wherein determination of the severity includes predicting a start time and a period of the temporary impairment;
   select one or more impairment handling techniques from a plurality of impairment handling techniques based on the severity of the temporary impairment; and
   execute the one or more impairment techniques such that altered content is presented by the portable device for the period of the temporary impairment to mitigate the effects of the temporary impairment on user experience during the period of the temporary impairment.

2. The system of claim 1, further comprising:
a cloud service configured to store a plurality of location tags uploaded into the cloud from a user community, where each of the location tags identifies a location in a wireless communication system that has poor signal reception;
wherein the processor predicts the future temporary impairment based on the location tags.

3. The system of claim 2, further comprising:
a server configured to periodically push at least some of the location tags onto the portable device.

4. The system of claim 2, wherein each of the location tags is weighted according to the number of community users reporting the location as having poor signal reception.

5. The system of claim 1, wherein the at least one processor is further configured to estimate a duration of the impairment.

6. The system of claim 5, wherein, in one impairment technique, the content is altered by time warping the content such that the time axis of the content is stretched or shrunk to align the content with the period of the temporary impairment.

7. The system of claim 1, wherein, in one impairment technique, the content is altered by substituting alternative content similar to the original content during the impairment.

8. The system of claim 7, wherein the alternative content is pushed onto the portable device from an external data source as a result of the processor predicting the impairment.

9. The system of claim 7, wherein the alternative content is pre-loaded onto the portable device.

10. The system of claim 7, wherein the alternative content is broadcasted to the portable device over a second wireless connection by an alternative source selected by the processor.

11. The system of claim 1, wherein, in one impairment technique, the content is altered by muting the content during the impairment.

12. The system of claim 1, wherein the processor is further configured to provide a user alert prior to the occurrence of the impairment.

13. The system of claim 1, wherein the processor predicts the future impairment based on data selected from the group consisting of GPS coordinates giving the location of the portable device, a speed and direction of travel calculated for the portable device based on GPS coordinates, a carrier network coverage map, time of day, local weather conditions, local traffic conditions, a user calendar, detected signal strength of a wireless connection to the portable device, and any suitable combination of the foregoing data.

14. A method of handling a temporarily impaired wireless connection to a portable device operating in a wireless communication system, comprising:
presenting content at the portable device, the content being delivered to the portable device over the wireless connection;
predicting, by the wireless communication system and based on user usage of the portable device, a future temporary impairment of the wireless connection;
determining a severity of the temporary impairment, wherein determination of the severity includes predicting a start time and a period of the temporary impairment;
selecting one or more impairment handling techniques from a plurality of impairment handling techniques based on the severity of the temporary impairment; and
executing the one or more impairment techniques such that altered content is presented by the portable device during the impairment to mitigate the effects of the temporary impairment on user experience during the period of the temporary impairment.

15. The method of claim 14, further comprising:
receiving a plurality of location tags from a cloud service, the location tags being uploaded into the cloud by a user community, where each of the location tags identifies a location in a wireless communication system that has poor signal reception; and
predicting the future temporary impairment based on the location tags and user usage of the portable device.

16. The method of claim 15, further comprising:
periodically pushing at least some of the location tags onto the portable device.

17. The method of claim 15, further comprising:
weighting each of the location tags according to the number of community users reporting the location as having poor signal reception.

18. The method of claim 14, further comprising:
estimating a duration of the impairment.

19. The method of claim 18, wherein executing includes time warping the content such that the time axis of the content is stretched or shrunk to align the content with the period of the temporary impairment.

20. The method of claim 14, wherein executing includes presenting alternative content by the portable device during the impairment.

21. The method of claim 20, further comprising:
pushing the alternative content onto the portable device from an external data source as a result of predicting the impairment.

22. The method of claim 20, further comprising: pre-loading the alternative content onto the portable device.

23. The method of claim 20, further comprising:
broadcasting the alternative content to the portable device over a second wireless connection by an alternative source selected by the processor.

24. The method of claim 14, wherein executing includes muting the content during the impairment.

25. The method of claim 14, further comprising:
providing a user alert by the portable device prior to the occurrence of the impairment.

26. The method of claim 14, wherein predicting the future impairment is based on data selected from the group consisting of GPS coordinates giving the location of the portable device, a speed and direction of travel calculated for the portable device based on GPS coordinates, a carrier network coverage map, time of day, local weather conditions, local traffic conditions, a user calendar, detected signal strength of a wireless connection to the portable device, and any suitable combination of the foregoing data.

27. A system, comprising:
means for presenting content at a portable device operating in a wireless communication system, the content being delivered to the portable device over a wireless connection;
means for predicting, based on user usage of the portable device, a future temporary impairment of the wireless connection;

means for determining a severity of the temporary impairment, wherein determination of the severity includes predicting a start time and a period of the temporary impairment;
means for selecting one or more impairment handling techniques from a plurality of impairment handling techniques based on the severity of the temporary impairment; and
means for executing the one or more impairment techniques such that altered content is presented by the portable device for the period of the temporary impairment to mitigate the effects of the temporary impairment on user experience during the period of the temporary impairment.

28. The system of claim 27, further comprising:
means for receiving a plurality of location tags from a cloud service, the location tags being uploaded into the cloud by a user community, where each of the location tags identifies a location in a wireless communication system that has poor signal reception; and
means for predicting the future temporary impairment based on the location tags and user usage of the portable device.

29. The system of claim 28, further comprising:
means for periodically pushing at least some of the location tags onto the portable device.

30. The system of claim 28, further comprising:
means for weighting each of the location tags according to the number of community users reporting the location as having poor signal reception.

31. The system of claim 27, further comprising:
means for estimating a duration of the impairment.

32. The system of claim 31, wherein the executing means includes means for time warping the content such that the time axis of the content is stretched or shrunk to align the content with the period of the temporary impairment.

33. The system of claim 27, wherein the executing means includes means for presenting alternative content by the portable device during the impairment.

34. The system of claim 33, further comprising:
means for pushing the alternative content onto the portable device from an external data source as a result of predicting the impairment.

35. The system of claim 33, further comprising: means for pre-loading the alternative content onto the portable device.

36. The system of claim 33, further comprising:
means for broadcasting the alternative content to the portable device over a second wireless connection by an alternative source selected by the processor.

37. The system of claim 27, further comprising means for muting the content during the impairment.

38. The system of claim 27, further comprising:
means for providing a user alert by the portable device prior to the occurrence of the impairment.

39. The system of claim 27, wherein predicting the future impairment is based on data selected from the group consisting of GPS coordinates giving the location of the portable device, a speed and direction of travel calculated for the portable device based on GPS coordinates, a carrier network coverage map, time of day, local weather conditions, local traffic conditions, a user calendar, detected signal strength of a wireless connection to the portable device, and any suitable combination of the foregoing data.

40. A non-transitory computer-readable medium embodying a set of instructions executable by one or more processors, comprising:
code for presenting content at a portable device operating in a wireless communication system, the content being delivered to the portable device over a wireless connection;
code for predicting, based on user usage of the portable device, a future temporary impairment of the wireless connection;
code for determining a severity of the temporary impairment, wherein determination of the severity includes predicting a start time and a period of the temporary impairment;
code for selecting one or more impairment handling techniques from a plurality of impairment handling techniques based on the severity of the temporary impairment; and
code for executing the one or more impairment techniques such that altered content is presented by the portable device for the period of the temporary impairment to mitigate the effects of the temporary impairment on user experience during the period of the temporary impairment.

41. The computer-readable medium of claim 40, further comprising:
code for receiving a plurality of location tags from a cloud service, the location tags being uploaded into the cloud by a user community, where each of the location tags identifies a location in a wireless communication system that has poor signal reception; and
code for predicting the future temporary impairment based on the location tags and user usage of the portable device.

42. The computer-readable medium of claim 41, further comprising:
code for periodically pushing at least some of the location tags onto the portable device.

43. The computer-readable medium of claim 41, further comprising:
code for weighting each of the location tags according to the number of community users reporting the location as having poor signal reception.

44. The computer-readable medium of claim 40, further comprising:
code for estimating a duration of the impairment.

45. The computer-readable medium of claim 44, further comprising code for time warping the content such that the time axis of the content is stretched or shrunk to align the content with the period of the temporary impairment.

46. The computer-readable medium of claim 40, further comprising code for presenting alternative content by the portable device during the impairment.

47. The computer-readable medium of claim 46, further comprising:
code for pushing the alternative content onto the portable device from an external data source as a result of predicting the impairment.

48. The computer-readable medium of claim 46, further comprising: code for pre-loading the alternative content onto the portable device.

49. The computer-readable medium of claim 46, further comprising:
code for broadcasting the alternative content to the portable device over a second wireless connection by an alternative source selected by the processor.

50. The computer-readable medium of claim 40, further comprising code for muting the content during the impairment.

51. The computer-readable medium of claim 40, further comprising:

code for providing a user alert by the portable device prior to the occurrence of the impairment.

52. The computer-readable medium of claim 40, wherein predicting the future impairment is based on data selected from the group consisting of GPS coordinates giving the location of the portable device, a speed and direction of travel calculated for the portable device based on GPS coordinates, a carrier network coverage map, time of day, local weather conditions, local traffic conditions, a user calendar, detected signal strength of a wireless connection to the portable device, and any suitable combination of the foregoing data.

* * * * *